(12) United States Patent
Ananda Ganesan et al.

(10) Patent No.: US 9,774,675 B2
(45) Date of Patent: Sep. 26, 2017

(54) AUTOMATIC REDUNDANT LOGICAL CONNECTIONS

(75) Inventors: Senthil-Kumar Ananda Ganesan, Karnataka (IN); Vasavi Sagi, Karnataka (IN); Anuradha Anantha Padmanabha, Karnataka (IN)

(73) Assignee: EntIT Software, Sunnyvale, CA (US)

( * ) Notice: Subject to any disclaimer, the term of this patent is extended or adjusted under 35 U.S.C. 154(b) by 1205 days.

(21) Appl. No.: 13/384,739

(22) PCT Filed: Oct. 26, 2009

(86) PCT No.: PCT/US2009/062104
§ 371 (c)(1),
(2), (4) Date: Jan. 18, 2012

(87) PCT Pub. No.: WO2011/025511
PCT Pub. Date: Mar. 3, 2011

(65) Prior Publication Data
US 2012/0120791 A1    May 17, 2012

(30) Foreign Application Priority Data

Aug. 28, 2009 (IN) .......................... 2079/CHE/2009

(51) Int. Cl.
*H04L 12/28* (2006.01)
*H04L 29/08* (2006.01)
(Continued)

(52) U.S. Cl.
CPC .......... *H04L 67/1097* (2013.01); *H04L 69/40* (2013.01); *H04W 28/04* (2013.01)

(58) Field of Classification Search
CPC .................................................. H04W 28/04
(Continued)

(56) References Cited

U.S. PATENT DOCUMENTS 7,275,103 B1 * 9/2007 Thrasher et al. ............. 709/224
7,797,393 B2 * 9/2010 Qiu et al. ...................... 709/213
(Continued)

FOREIGN PATENT DOCUMENTS

| CN | 1519736 A | 8/2004 |
|---|---|---|
| CN | 1825833 A | 8/2006 |

(Continued)

OTHER PUBLICATIONS

European Patent Office; Extended European Search Report for Appl. No. 09848853.9 dated Jul. 21, 2016 (9 pages).
(Continued)

*Primary Examiner* — Mohammad Anwar
*Assistant Examiner* — Angel Brockman

(57) ABSTRACT

A method (600) includes: providing (602) a physical connection topology and a logical connection topology between a host (302) and a logical unit hosted on a storage array (308), the topologies including all network fabrics to which both the host (302) and the storage array (308) belong; determining (604) at least one single point of failure is located between the host (302) and the logical unit within a particular network fabric; attempting (606) to create a fully redundant logical connection between the host (302) and the logical unit within the particular fabric; if a fully redundant logical connection is not possible in the particular fabric, attempting (608) to create a fully redundant logical connection between the host (302) and the logical unit using an alternate fabric; and if a fully redundant logical connection is not possible in the topologies, attempting (610) to create a partially redundant logical connection between the host (302) and the logical unit within the particular network fabric.

5 Claims, 9 Drawing Sheets

(51) Int. Cl.
*H04W 28/04* (2009.01)
*H04L 29/14* (2006.01)

(58) Field of Classification Search
USPC .......................................... 370/225, 242, 244
See application file for complete search history.

(56) References Cited

U.S. PATENT DOCUMENTS

| | | | |
|---|---|---|---|
| 7,801,859 B1 * | 9/2010 | Desai et al. ................. | 707/640 |
| 8,677,203 B1 * | 3/2014 | Shalvi et al. ................ | 714/747 |
| 2003/0126315 A1 | 7/2003 | Tan et al. | |
| 2004/0267980 A1 | 12/2004 | McBrearty et al. | |
| 2008/0244580 A1 | 10/2008 | Fujita et al. | |
| 2008/0250042 A1 | 10/2008 | Mopur et al. | |

FOREIGN PATENT DOCUMENTS

| | | |
|---|---|---|
| CN | 101232402 A | 7/2008 |
| EP | 1840746 | 10/2007 |

OTHER PUBLICATIONS

Hewlett-Packard Company, A method to find the single point of failures in the physical links and the devices in the SAN topology from an application perspective, Research Disclosure, Mason Publications, vol. 529, No. 65, May 1, 2008 (4 pages).

Ismail Ari et al., SANBoost: Automated SAN-Level Caching in Storage Area Networks, 2004 (8 pages).

\* cited by examiner

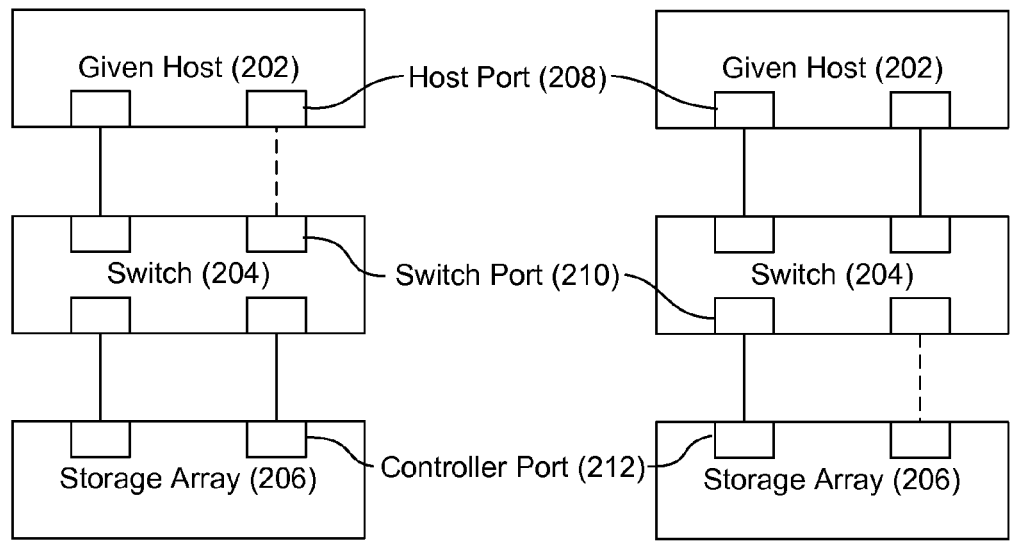
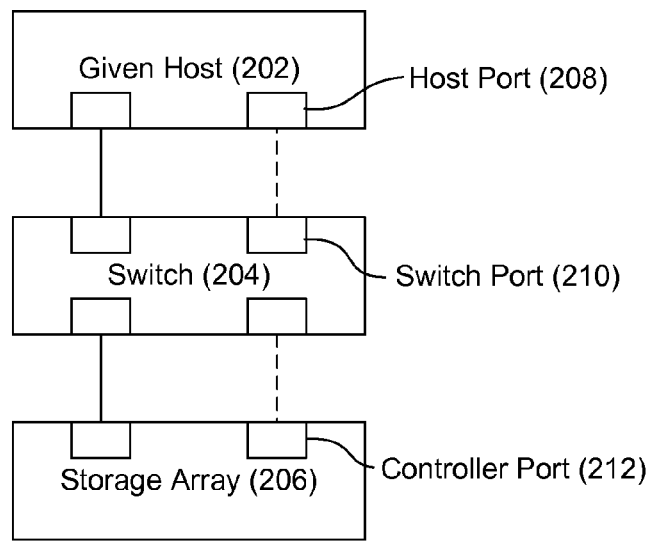

AUTOMATIC REDUNDANT LOGICAL CONNECTIONS

BACKGROUND

A network may include many physical connections between a host and a logical unit hosted by a storage array within the network. However, the logical connections between the host and logical unit are what actually make the logical units visible and usable by the hosts; therefore, in order for the logical unit to be accessed by the host, there must be at least one existing logical connection between the host and logical unit.

When a single point of failure is located between the host and a logical unit, a failure at that single point of failure causes the logical unit to be completely severed from the host. This single point of failure must be repaired or another logical connection needs to be opened in order to allow the host to access the logical unit. If the network includes redundant logical connections between the host and logical unit, a logical link failure in the network is less likely to completely sever the logical unit from the host.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIGS. 2A-2C are block diagrams showing illustrative network topology configurations which will allow fully redundant logical connections on the same network fabric, according to one embodiment of principles described herein.

Throughout the drawings, identical reference numbers designate similar, but not necessarily identical, elements.

DETAILED DESCRIPTION

Figure 1:
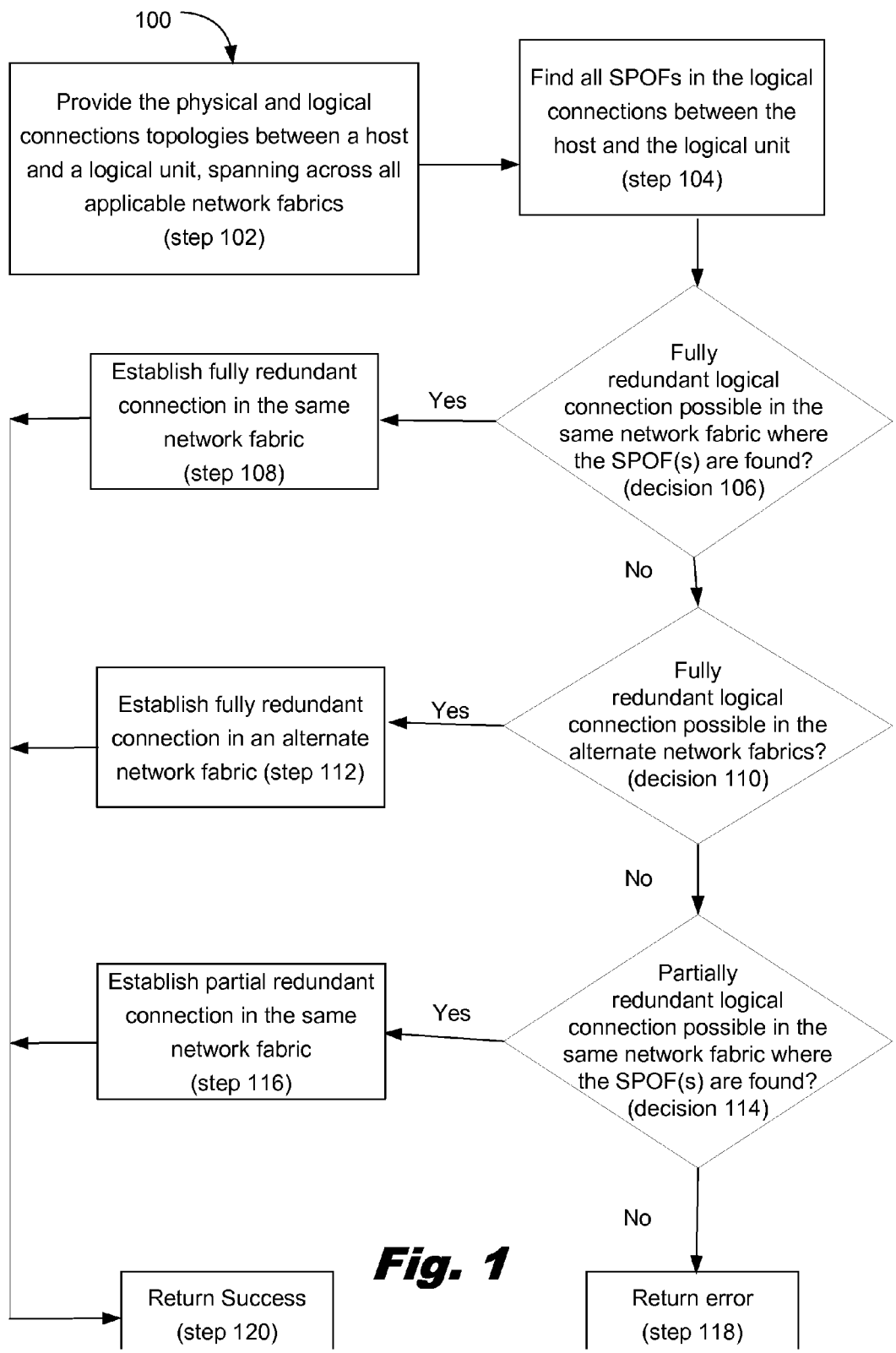
FIG. 1 is a flow diagram showing an illustrative method for establishing redundant logical connections between a host and a logical unit, according to one embodiment of principles described herein.

The present specification relates to a storage automation system and method for automatically creating redundancies in the logical connections between a host and its storage logical units. More specifically, the method and system automatically create redundant logical connections between a host and a logical unit when single point of failure logical links are discovered in existing logical connections between the host and logical unit. When a single point of failure is detected, either through a proactive method of finding single points of failure or through a reactive method that finds the single point of failures induced by real-time failures occurring in the storage array network, the method according to the present specification may be run.

As used in the present specification and appended claims, the term "logical unit" is broadly interpreted to include a device or entity that is assigned a number within a computer storage system, and is addressed by input/output operations. The logical unit may be configured according to Small Computer System Interface (SCSI) protocol, which is a set of standards for physically connecting and transferring data between computers and peripheral devices. The logical unit may be a SCSI entity that is part of a SCSI target at an endpoint that does not initiate sessions with a SCSI initiator (such as a host), but instead waits for input/output commands from the host. The logical unit is assigned a logical unit number (LUN) so that the host is able to locate the logical unit in order to send the input/output command.

As used in the present specification and appended claims, the term "network fabric" is broadly interpreted to include a network topology where nodes in the network connect with each other using network switches. The switches may be crossbar switches, connecting the switches in a pattern similar to threads in a network fabric from which the term is derived. The network fabric may include devices compatible with the Fibre Channel (FC) protocol, which is a high-speed network technology that is especially useful for storage networking. A particular network topology may employ more than one network fabric.

As used in the present specification and in the appended claims, the term "host" may be broadly interpreted to include a device or system which hosts information or provides services for other systems. A host may be connected to a variety of resources including a storage array. A host may behave as a server by providing information and resources to other devices and/or entities on a network. Also as used herein, the term "Single Point of Failure" (SPOF) refers to a logical link that is part of all logical connections between a host and a logical unit.

In many storage area networks (SANs), when there are SPOFs in the logical connections between a host and a particular logical unit, system administrators generally need to manually find the logical connection possibilities in the network fabric in which the SPOFs are located, and/or in any alternate network fabrics as possible that are supported by the availability of physical connections, and manually create redundant logical connections between the host and logical unit. This can be a very time consuming task depending on the size and complexity of the network. Consequently, a method for automatically finding the SPOFs may help find the SPOFs much faster and easier than searching manually. Such a method may be found in the publication "A method to find the single point of failures in the physical links and the devices in the SAN topology from an application perspective," *Research Disclosure Journal*, May 1, 2008, pp. 453-54 (published by Hewlett-Packard), which is hereby incorporated by reference for all that it contains.

In addition to the SPOF finding algorithm, the method of the present specification for automatically establishing redundant logical connections between the host and logical unit is also very helpful in reducing the amount of time and effort needed to reestablish the logical connection or to create a new logical connection. The present method may be run either reactively after a failure event in the SAN which can either induce SPOFs in the logical connections or completely sever the logical unit from the host, or proactively to prevent a failure from occurring because of preexisting SPOFs in the logical connections, depending on the desired operation of the network. The present method may be used to fix failures that completely break the connection between a given host and logical unit, as well as being able to create new logical connections between the host and logical unit. Because this method may be run reactively, the broken connection may be automatically restored in very little time, which is difficult to achieve manually.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

FIG. 1 shows a method (100) for automatically creating redundant logical connections in a network after the discovery of SPOFs between a host and a logical unit. According to one illustrative embodiment, the method (100) may include providing (step 102) the physical connections topology and the logical connections topology between a host and a logical unit (step 102), which can span across multiple network fabrics, finding (step 104) all SPOFs in the logical connections between the host and a logical unit, and determining (decision 106) if a fully redundant logical connection is possible in the same network fabric where any SPOFs are found (decision 106). If a fully redundant logical connection in the same fabric is possible, the method will establish the fully redundant logical connection in the same fabric (step 108). The method may return success (step 120), and may notify network administrators of any action that was taken.

If it is determined (NO, decision 106) that a fully redundant logical connection in the same network fabric is not possible, it may then be determined (decision 110) whether a fully redundant logical connection is possible in an alternate network fabric other than the fabric where the SPOF was found. If a fully redundant logical connection in an alternate network fabric is possible, the method will establish the fully redundant logical connection in the alternate fabric (step 112). The method may return success (step 120), and may also indicate to network administrators any action that has been taken.

If it is determined (NO, decision 110) that a fully redundant logical connection in an alternate network fabric is not possible, it may then be determined (decision 114) whether a partially redundant logical connection in the same network where the SPOF was found is possible. If a partially redundant logical connection in the same network fabric as the SPOF is possible, the partially redundant logical connection will be established (step 116). The method may return success (step 120), and may indicate any action taken. If it is determined (NO, decision 114) that a partially redundant logical connection is not possible, an error may be returned (step 118).

According to some embodiments, the network may be a SAN. In such a network, there may be many physical connections between a particular host and the logical units hosted by one or more storage arrays. The physical connections may be through one or more storage network fabrics that are made up of a plurality of interconnected switches. As previously mentioned, the switches may be configured to operate according to FC protocol and may be interconnected in a crossbar pattern. The physical connections between points may include wires, fiber-optic cables, or any other electrical connection that allows high-speed data transfer useful for such a network.

While there can be many physical connections between a host and a storage logical unit, the logical connections in the network between the logical unit and the host are what make the logical unit visible and usable to the host. A logical connection between the host and logical unit is a connection that is established through a physical connection and recognized by the host and the storage array, such that the pathway is known and remembered by the host. A logical connection may also indicate that zones and Host Security Groups (HSGs) in the network fabric are available so that the logical unit can be seen on the host as one raw volume. For a certain number of logical connections between the host and logical unit, that same number of raw volumes is seen on the host for that particular logical unit. The logical connections may also span across multiple network fabrics, in some cases.

According to the method (100), both physical and logical connection topologies between the given host and the given logical unit are provided as input (step 102). These topologies can span across multiple network fabrics. These topologies may be calculated using software capable of managing a SAN or other host-storage configuration."

The method then runs the previously mentioned method for automatically finding any SPOFs between the host and logical unit (step 104). If no SPOFs are found, the method may return success and notify network administrators that there are redundant logical links between the given host and logical unit. SPOFs may be located in one or more areas of connection between the host and logical unit. Each logical connection may be modeled with the help of three logical links: the connection between the host's Host Bus Adapter (HBA) port and its SAN switch port; the connection between one switch port and another switch port, if there are any inter-switch links in the path; and the connection between the switch port and the controller port on the storage array where the logical unit is hosted. In the third link of the path—the connection between the switch port and controller port—the connection between a controller port and a logical unit is always singular from the perspective of a logical connection, even though one controller port can host many logical units, and one logical unit can be exposed via many controller ports. Consequently, the third link of the connection may also be termed simply as the connection between the switch port and the logical unit for simplicity purposes.

Any or all of these three logical links may be SPOFs. In other words, when one of these logical links is an SPOF, any and all logical connections between the given host and logical unit will include that SPOF logical link. Consequently, when a failure occurs at an SPOF, the logical unit to which the host was connected via the logical connection containing the SPOF is completely severed from the host and is unreachable by the host until the SPOF is fixed. The lack of redundant logical links at an SPOF may be because of an original mis-configuration while setting up the connections, or because of an error or failure in the SAN hardware or software that led to the inducement of the SPOF.

When an SPOF is found, the network may run a program to determine how and where to create redundant logical link connections where the SPOF was found. For example, if the SPOF was found between the HBA port and switch between a host and a logical unit, the program will examine the SAN to find other possible physical connections where logical connections may be established in order to create the desired redundancy.

According to the method, it may be determined (decision 106) whether or not a fully redundant logical connection is possible in the same fabric where the SPOF(s) are found. According to some embodiments, the connection between the switch port and other switch ports in an inter-switch link is automatically monitored and handled by the network fabric. In such a case, in order to determine which redundant logical connections to establish, the method first attempts to create a fully redundant logical connection between the host and the logical unit by creating redundant logical links between the HBA port and switch port and between the switch port and logical unit, as applicable. In some instances, the network may already include redundant logical links between the HBA port and switch port, so the method would bypass that branch of the connection and only attempt to create redundant logical links between the switch port and the logical unit. According to another embodiment, the network may already include redundant logical links between the switch port and the logical unit, so the method would only attempt to create redundant logical links between the HBA port and the switch port.

As previously mentioned, if the method determines (NO, decision 106) that fully redundant logical connections are not possible in the same network fabric of the SPOF(s), for example because there are not sufficient physical connections in the same fabric to establish alternative pathways between a given host and logical unit, then the method may determine (decision 110) whether or not a fully redundant logical connection is possible in an alternate network fabric. If no fully redundant logical connection is possible, the method determines (decision 114) whether a partially redundant logical connection is possible. If a partially redundant logical connection is possible, the method may then create a partially redundant logical connection between the host and logical unit.

A partially redundant logical connection includes redundancies in at least one and at most two of the three logical links between the host and logical unit, but not redundancies in all three logical links. For example, establishing a partially redundant logical connection between a given host and logical unit may include a redundant logical link between the HBA port and the switch port and a redundant logical link between one switch port to another switch port, but a single logical link between the switch port and the controller port. In another example, the logical connection may include a redundancy between the switch port and the controller port, but a single connection between the HBA port and switch port, with the inter-switch links being handled automatically by the network fabric. Other examples of partially redundant connections may exist, some of which will be described below.

If the method determines (NO, decision 114) that no redundancies can be made in the logical connection between the given host and logical unit, the method may return (step 118) an error to notify network administrators. A returned error may notify the administrators that some action needs to be taken with regard to the network, such as repairing connections or replacing damaged parts. In order to fix the non-redundancy or partial redundancy of the network, network administrators may be able to provide remedies such as creating more physical connections between the host and logical unit, or by repairing damaged physical connections.

There may be a variety of network topology configurations in which the method for establishing redundant logical connections may be used. FIGS. 2A-2C are block diagrams showing illustrative network topology configurations (200) which will allow fully redundant logical connections on the same network fabric. According to one illustrative embodiment, there may be logical links (214) and/or physical links (216) between a given host (202) and a switch (204). Likewise, there may be logical links (214) and/or physical links (216) between a switch (204) and a storage array (206). A storage array may contain a number of logical units.

A logical link (214) is illustrated in FIG. 2 as a solid line. A logical link also implies an underlying physical link. A physical link (216) having no overlaying logical link is illustrated by a dotted line.

A connection between a given host (202) and a switch (204) may include a link between an HBA port (208) on a given host (202) and a switch port (210) on a switch (204). Likewise, a connection between a switch (204) and a storage array (206) may include a link between a switch port (210) on a switch (204) and a controller port (212) on a storage array (206). The type of physical link used may include, but is not limited to, an Ethernet cable, a coaxial cable, a fiber optic cable, one or more electrical conductors, a wireless connection or the like.

FIG. 2A illustrates a case where there is only one logical link (214) between a given host (202) and a switch (204); however, a physical link (216) is also available between the host (202) and switch (204). Furthermore, there are two logical links from the switch (204) to the storage array (206). Because there is only one logical link from the given host (202) to the switch (204), this network configuration contains an SPOF. When the method for creating redundant logical connections described herein is used on this network configuration, a logical link may be established over the available physical link (216) between the given host (202) and the switch (204). Thus, a fully redundant logical connection between the given host (202) and the storage array (206) may be established.

FIG. 2B illustrates a case where there are two logical links between a given host (202) and a switch (204). Furthermore, there is only one logical link (214) from the switch (204) to the storage array (206); however, there is an available physical link between the switch (204) and the storage array (206) as well. Because there is only one logical link from the switch (204) to the storage array (206), this network configuration has an SPOF. When the method for creating redundant logical connections described herein is used on this network configuration, a logical link may be established over a physical link (216) between the switch (204) and the storage array (206). Thus, a fully redundant logical connection between the given host (202) and the storage array (206) may be established.

FIG. 2C illustrates a case where there is only one logical link (214) between a given host (202) and a switch (204), and only one logical link from the switch (204) to the storage array (206). However, there is also a physical link (216) from the host (202) to the switch (204) and from the switch (204) to the storage array (206). Because there is only one logical connection from the host (202) to the storage array (206), this network configuration has an SPOF between the host (202) and the switch (204), and an SPOF from the switch (204) to the storage array (206). When the method for creating redundant logical connections described herein is used on this network configuration, a logical link (214) may be established over a physical link (216) between the given host (202) and the switch (204). A logical link may also be established between the switch (204) and the storage array (206). Thus, a fully redundant logical connection between the given host (202) and the storage array (206) may be established.

Figure 3A:
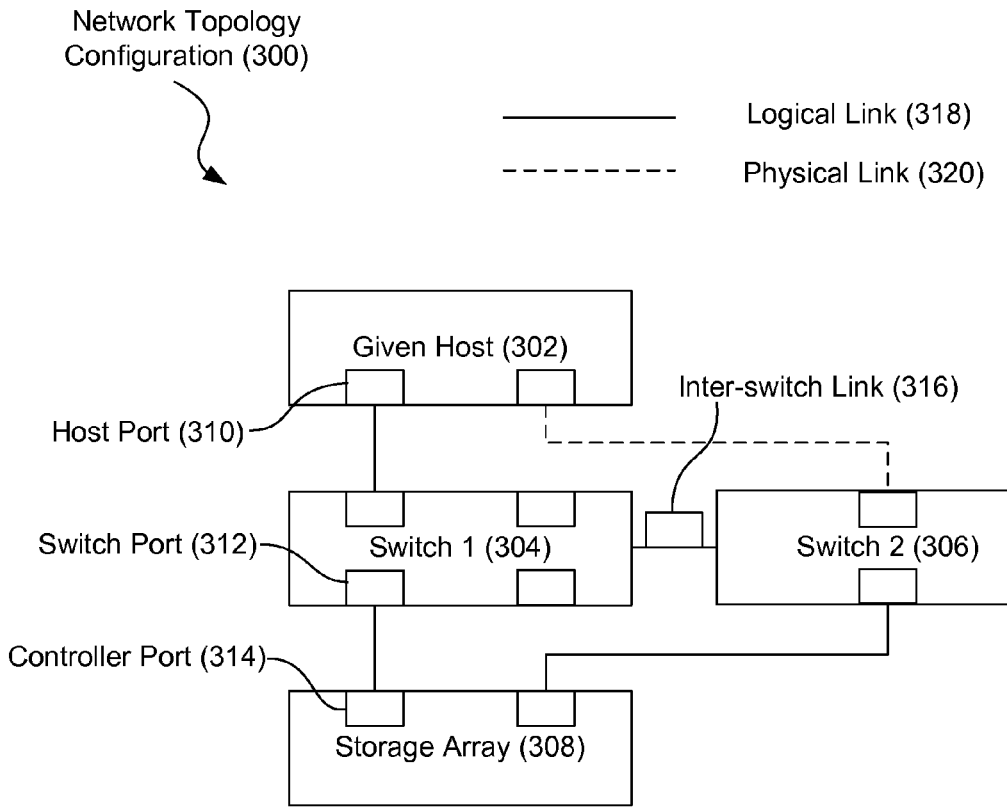
FIGS. 3A-3C are block diagrams showing illustrative network topology configurations with cascaded switches interconnected with inter switch links, which will allow fully redundant logical connections on the same network fabric, according to one embodiment of principles described herein.
Figure 3B:
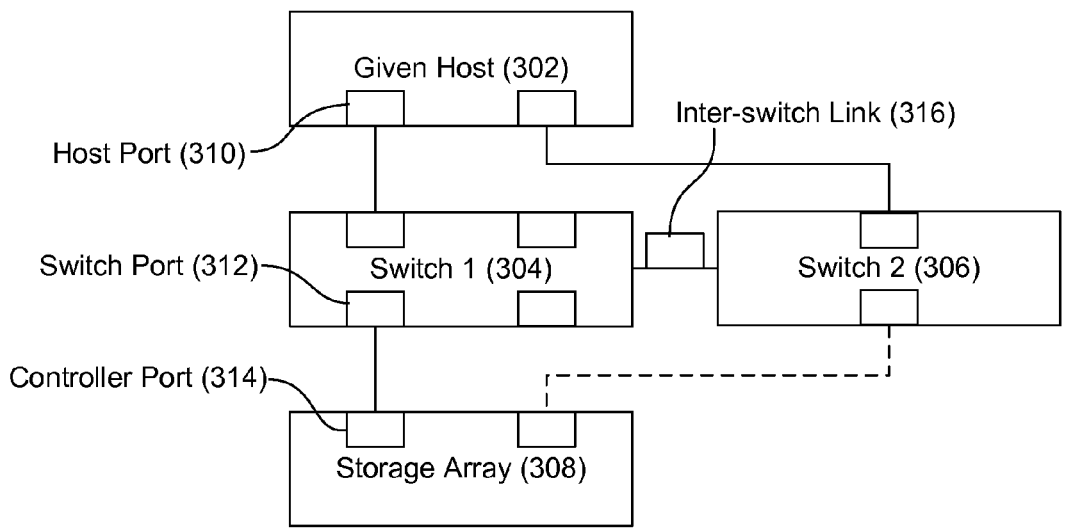
Figure 3C:
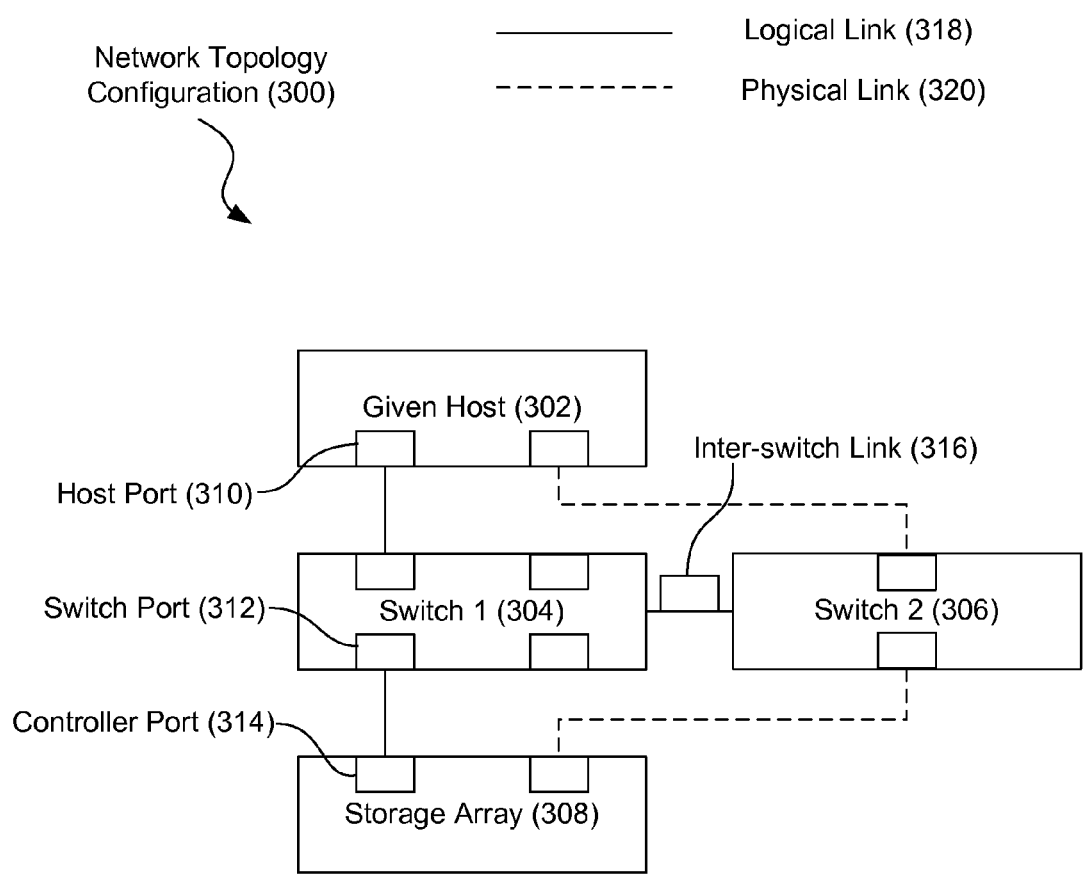

FIGS. 3A-3C are block diagrams showing illustrative network topology configurations (300) which have at least one SPOF, but will allow fully redundant logical connections on the same network fabric as the SPOF. According to one illustrative embodiment, a redundant logical connection may go through an alternate switch (306). The alternate switch (306) may be connected to the first switch (304) through an inter-switch link (316). As such, logical connections through the alternate switch are considered to be within the same network fabric.

Similar to FIG. 2, a logical link (318) is illustrated in FIG. 3 as a solid line. A physical link (320) having no overlaying logical link is illustrated by a dotted line.

A link between a given host (302) and a switch (304) may include a link between a host bus adapter port (310) on a given host (302) and a switch port (312) on a switch (304). Likewise, a link between a switch (304) and a storage array (308) may include a link between a switch port (312) on a switch (304, 306) and a controller port (314) on a storage array (308). The storage array may contain a number of logical units. There may be a plurality of switches on the same network fabric. These switches will be linked through an inter-switch link (316).

FIG. 3A illustrates a case where there is one logical link (318) between a give host (302) and a switch (304) and no other physical links on which to establish a logical connection between the given host (302) and the switch (304). However, there is an available physical link (320) to a second switch (306) which in turn has a logical link (318) to the storage array (308). The two switches (304, 306) are connected by an inter-switch link (316) which indicates that any logical connections through either of the switches (304, 306) occur on the same network fabric. When the method for establishing redundant logical connections described herein is used on this network configuration, a logical link may be formed on the physical link (320) between the given host (302) and the second switch (306). Thus, a complete redundant logical connection between the given host (302) and the storage array (308) may be established.

FIG. 3B illustrates a configuration in which there is a logical link (318) between a given host (302) and a first switch (304), and a logical link between the switch (304) and a storage array (308). There are no other physical links on which to establish a logical connection between the first switch (304) and the storage array (308). However, there is an available physical link (320) between the storage array (308) and a second switch (306), as well as a logical link (318) already established between the given host (302) and the second switch (306). The two switches (304, 306) are also connected by an inter-switch link (316), indicating that any logical connections established between the host (302) and storage array (308) through either of the switches (304, 306) occur on the same network fabric. When the method for establishing redundant logical connections described herein is used on this network configuration, a logical link may be formed on the physical link (320) between the second switch (306) and the storage array (308), establishing a complete redundant logical connection between the given host (302) and the storage array (308).

FIG. 3C illustrates a case where there is one logical link (318) between a given host (302) and a switch (304) and a logical link (318) between a switch (304) and the storage array (308). There are no other physical links (318) on which to establish a logical connection between the given host (302) and the storage array (308) through only the first switch (304). However, there is an available physical link (320) between the host (302) and a second switch (306) which in turn has a physical link (320) to the storage array (308). When the method for establishing redundant logical connections described herein is used on this network configuration, a logical link may be formed on the physical link (320) between the given host (302) and the second switch (306). In addition, a logical connection will be formed on the physical link between the second switch (306) and the storage array (308). Thus, a complete redundant logical connection between the given host (302) and the storage array (308) may be established.

Figure 4A:
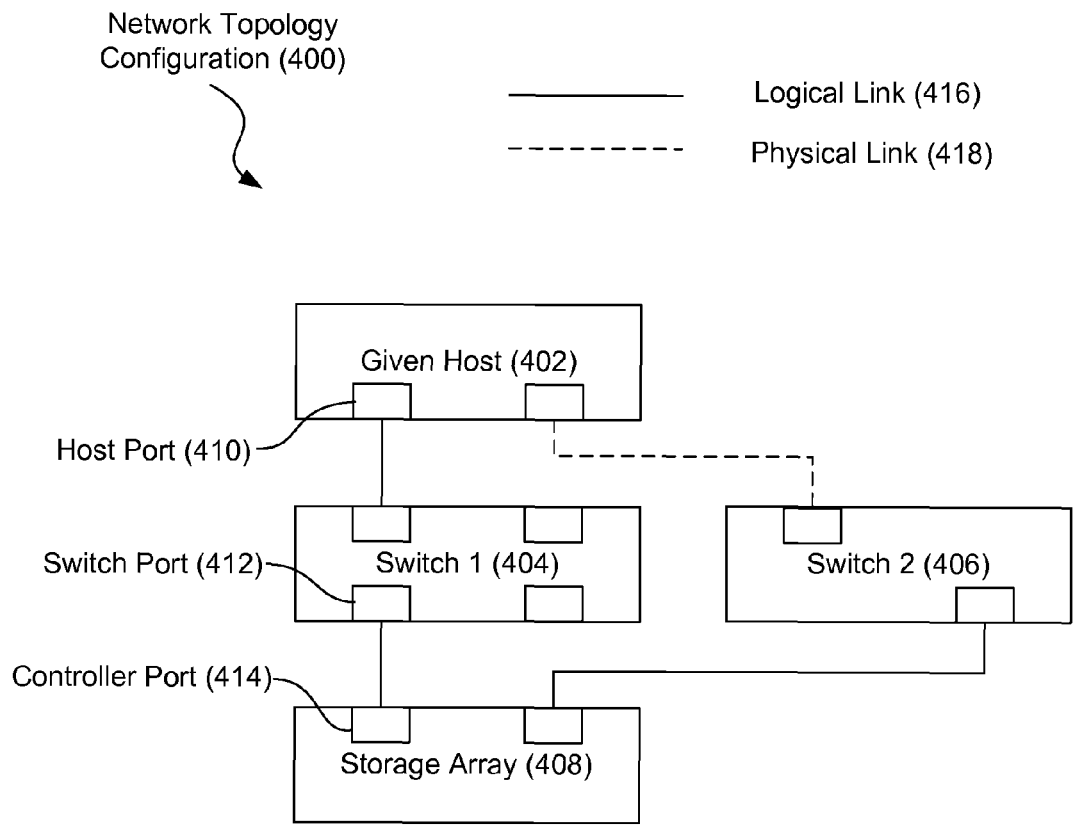
FIGS. 4A-4C are block diagrams showing illustrative network topology configurations which will allow fully redundant logical connections on an alternate network fabric, according to one embodiment of principles described herein.
Figure 4B:
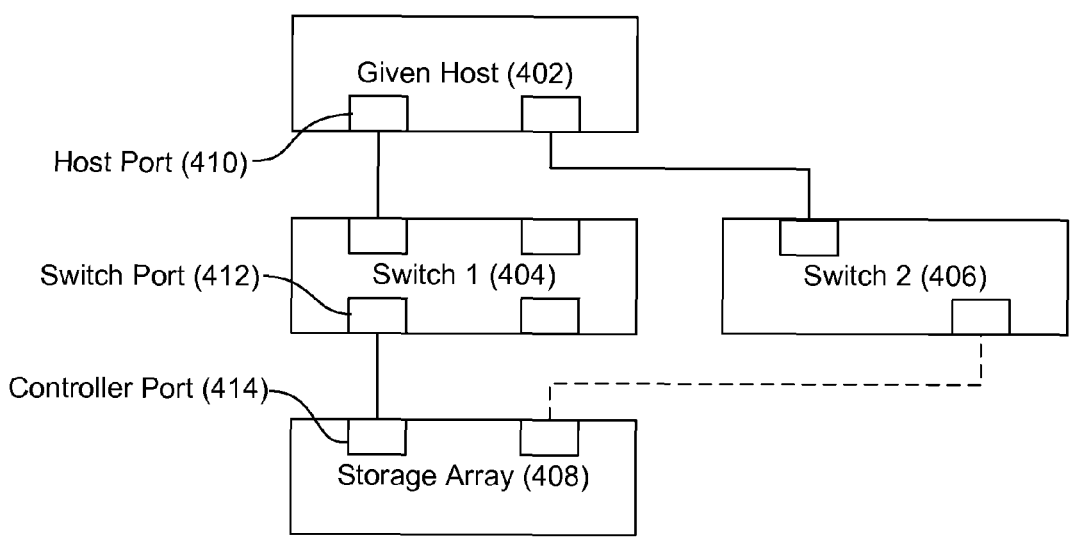
Figure 4C:
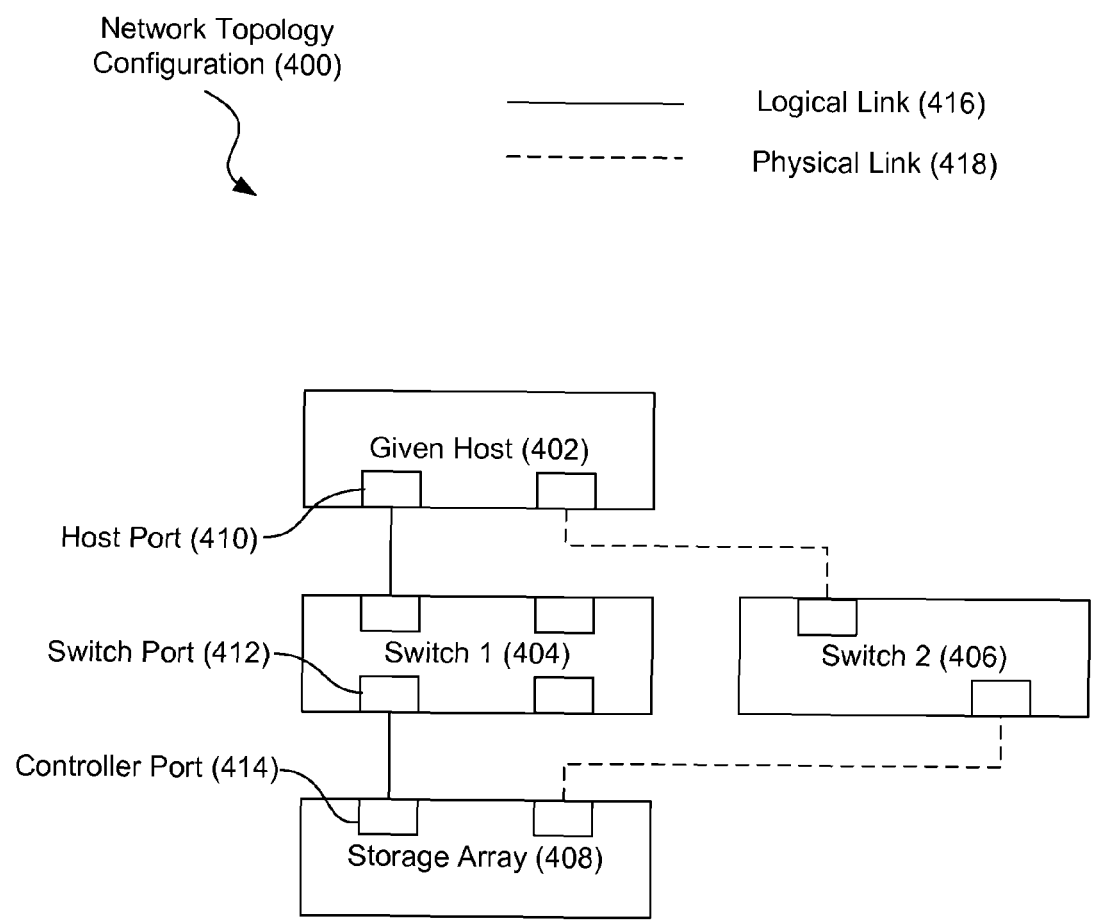

FIGS. 4A-4C are block diagrams showing illustrative network topology configurations (400) which have at least one SPOF, but will allow fully redundant logical connections on an alternate network fabric other than the fabric in which the SPOF or SPOFs were found. According to one illustrative embodiment, there may be no available physical connections on the same network fabric on which to establish a redundant logical connection. However, there may be additional network fabrics available. More specifically, there may be other switches which are part of an alternate network fabric in which a physical link may be available. Logical links over these physical links may be established in order to provide a fully redundant logical connection between a given host (402) and a storage array (408).

Similar to previous figures, a logical link (416) is illustrated in FIG. 4 as a solid line. A physical link (418) having no overlaying logical Ink is illustrated by a dotted line.

A link between a given host (402) and a switch (404) may include a link between a host bus adapter port (410) on a given host (402) and a switch port (412) on a switch (404, 406). Likewise, a link between a switch (404, 406) and a storage array (408) may include a link between a switch port (412) on a switch (404) and a controller port (414) on a storage array (408). The storage array may contain a number of logical units. There may be a plurality of switches on a network. These switches may be components of several different network fabrics.

FIG. 4A illustrates a case where there is only one logical link (416) between a given host (402) and a switch (404) as well as a logical link (416) between the switch (404) and the storage array (408). Furthermore, there are no available physical links on which to establish a redundant logical connection through the switch (404). However, there is a logical link (416) from the storage array (408) to a second switch (406) which is part of a different network fabric. The second switch (406) has a physical link (418) to the host (402). When a method for establishing fully redundant logical connections described herein is used on this network configuration, a logical link may be established over the physical link (418) between the second switch (406) and the host (402). Thus, a complete redundant logical connection between the given host (402) and the storage array (408) may be established over a plurality of fabrics.

FIG. 4B illustrates a case where there is only one logical link (416) between a given host (402) and a switch (404) as well as a logical link (416) between the switch (404) and the storage array (408). Furthermore, there are no available physical links on which to establish a redundant logical connection through the switch (404). However, there is a logical link (416) from the host (402) to a second switch (406) which is part of a different network fabric. The second switch (406) has a physical link (418) to the storage array (408). When a method for establishing fully redundant logical connections described herein is used on this network configuration, a logical link may be established over the physical link (418) between the second switch (406) and the storage array (408). Thus, a complete redundant logical connection between the given host (402) and the storage array (408) may be established over a plurality of fabrics.

FIG. 4C illustrates a case where there is only one logical link (416) between a given host (402) and a switch (404) as well as a logical link (416) between the switch (404) and the storage array (408). Furthermore, there are no available physical links on which to establish a redundant logical connection via the first switch (404). However, there is a physical link (418) from the host (402) to a second switch (406) which is part of a different network fabric. The second switch also has a physical link (418) to the storage array (408). When a method for establishing fully redundant logical connections described herein is used on this network configuration, a logical link (416) may be established over the physical link (418) between the given host (402) and the second switch (406). In addition, a logical link (416) may be established over the physical link (418) between the second switch (406) and the storage array (408). Thus, a complete redundant logical connection between the given host (402) and the storage array (408) may be established.

Figure 5A:
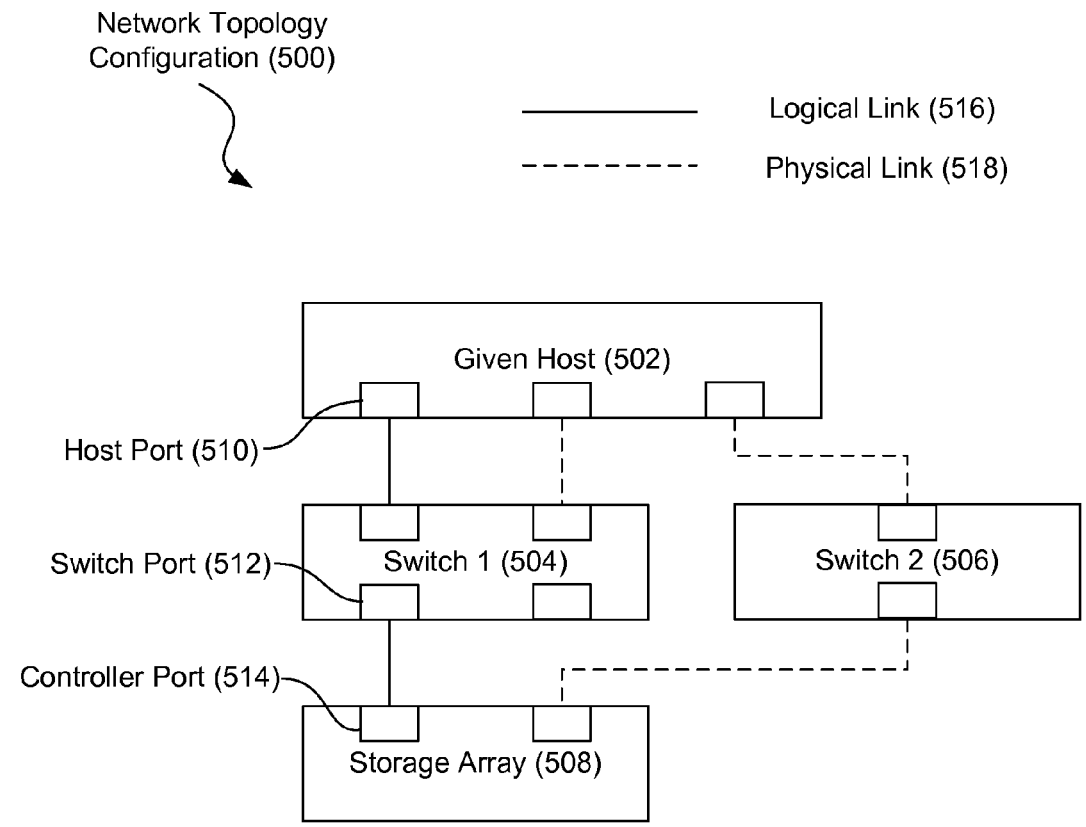
FIGS. 5A-5B are block diagrams showing illustrative network topology configurations which will allow partially redundant logical connections on the same network fabric and fully redundant logical connections on an alternate network fabric, according to one embodiment of principles described herein.
Figure 5B:
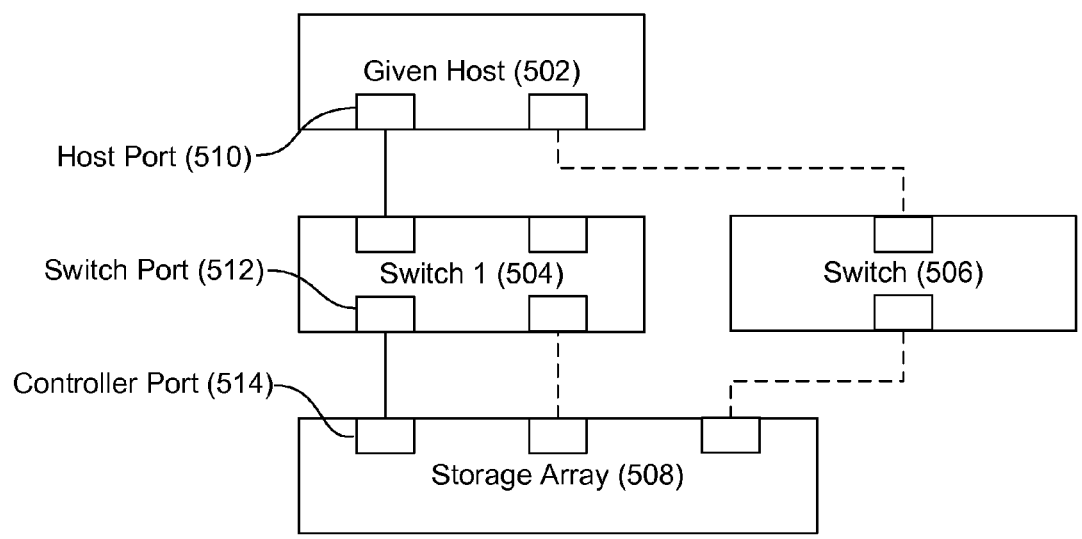

FIGS. 5A-5B are block diagrams showing illustrative network topology configurations (500) which will allow partially redundant logical connections on the same network fabric as the SPOF or SPOFs and fully redundant logical connections on an alternate network fabric other than the fabric in which the SPOF or SPOFs were found. According to one illustrative embodiment, there may be partially redundant logical connections on one network fabric and a fully redundant logical connection when using an alternate network fabric. A partially redundant logical connection refers to a network configuration in which there is redundancy of logical links between the given host (502) and a switch (504, 506), or a switch (504, 506) and a storage array (508), but not both.

Similar to previous figures, a logical link (516) is illustrated in FIG. 5 as a solid line. A physical link (518) having no overlaying logical link is illustrated by a dotted line.

A link between a given host (502) and a switch (504, 506) may include a link between a host bus adapter port (510) on a given host (502) and a switch port (512) on a switch (504, 506). Likewise, a link between a switch (504, 506) and a storage array (508) may include a link between a switch port (512) on a switch (504) and a controller port (514) on a storage array (508). There may be a plurality of switches on a network. These switches may be components of several different network fabrics.

FIG. 5A illustrates a case where there is one logical link (516) between a given host (502) and a switch (504) as well as an available physical link (518). The switch (504) in turn has one logical link (516) to the storage array (508). Because a redundant logical connection may be established using the available physical link (518) between the given host (502) and the switch (504), a partially redundant logical connection may be established between the given host (502) and the storage array (508). The partially redundant logical connection includes the redundant logical links (516) between the host (502) and the switch (504). To create a fully redundant logical connection, a second switch (506) being part of an alternate network fabric may be used. The second switch (506) may be used if that switch contains at least a physical link (518) from the given host (502) to the second switch (506) and a physical link from the second switch (506) to the storage array (508). When using the method for establishing redundant logical connections is used on this network configuration, a logical link (516) may be established over the physical link (518) between the given host (502) and the second switch (506). In addition, a logical link (516) may be established over the physical link (518) between the second switch (506) and the storage array (508). Thus, a complete redundant logical connection between the given host (502) and the storage array (508) may be established.

FIG. 5B illustrates a case where there is one logical link (516) between a given host (502) and a switch (504). The switch (504) in turn has one logical link (516) to the storage array (508) as well as an available physical link (518). Because a redundant logical connection may be formed using the available physical link (518) between the switch (504) and the storage array (508), a partially redundant logical connection may be formed between the given host (502) and the storage array (508). The partially redundant logical connection includes the redundant logical links (516) between the switch (504) and the storage array (508). To create a fully redundant logical connection, a second switch (506) being part of an alternate network fabric may be used. The second switch (506) may be used if that switch contains at least a physical link (518) from the given host (502) to the second switch (506) and a physical link (518) from the second switch (506) to the storage array (508). When using the method for establishing redundant logical connections is used on this network configuration, a logical link (516) may be established over the physical link (518) between the given host (502) and the second switch (506). In addition, a logical link (516) may be established over the physical link (518) between the second switch (506) and the storage array (508). Thus, a complete redundant logical connection between the given host (502) and the storage array (508) may be established.

The network configurations in which the method for establishing a redundant logical connection may be used is not limited to the network configurations illustrated and described above. Any network configuration having available physical connections which may be used to establish redundant logical connections may be used.

Figure 6:
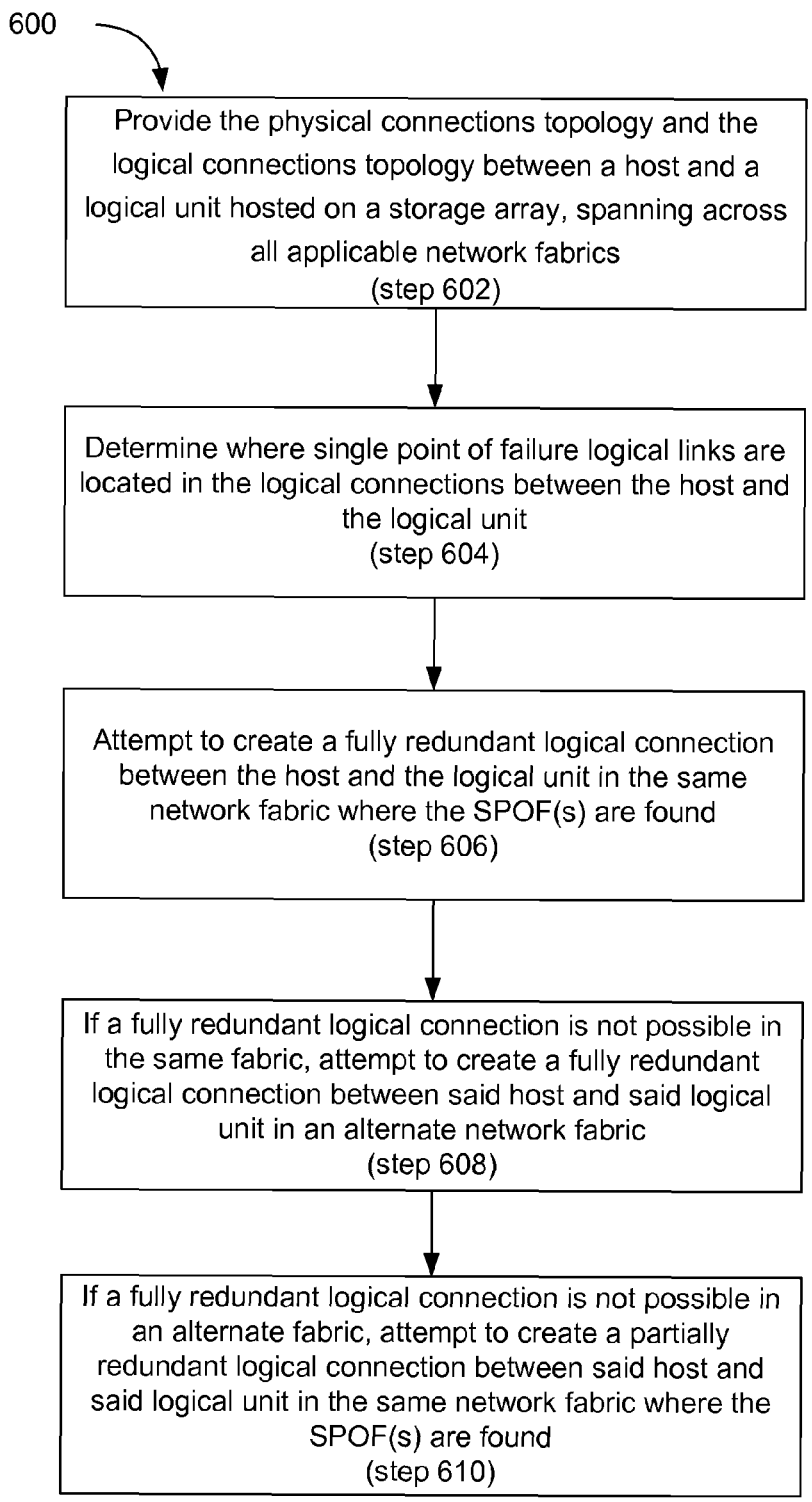
FIG. 6 is a flow chart showing an illustrative method for creating redundant logical connections, according to one embodiment of principles described herein.

FIG. 6 is a flow chart showing an illustrative method (600) for creating redundant logical connections. According to one illustrative embodiment, a physical connection topology and logical connection topology are provided (step 602) between a host and a logical unit hosted on a storage array. These physical and logical connection topologies may span across more than one network fabric. It may then be determined (step 604) where one or more SPOFs are located between the host and the logical unit. SPOFs occur where there is a single logical link in the logical connection topology through which all logical connections are formed.

It may then be attempted (step 606) to create a fully redundant logical connection between the host and the logical unit in the same network fabric where the SPOF or SPOFs are found. SPOFs for a given host and logical unit are found in only one network fabric at any given point in time. If a fully redundant logical connection is not possible in the same network fabric as the SPOF(s), it may be attempted (step 608) to create a fully redundant logical connection between the given host and logical unit using an alternate network fabric. If no fully redundant logical connection is possible, it may be attempted (step 610) to create a partially redundant logical connection between the host and the logical unit in the same network fabric as the SPOF(s).

Figure 7:
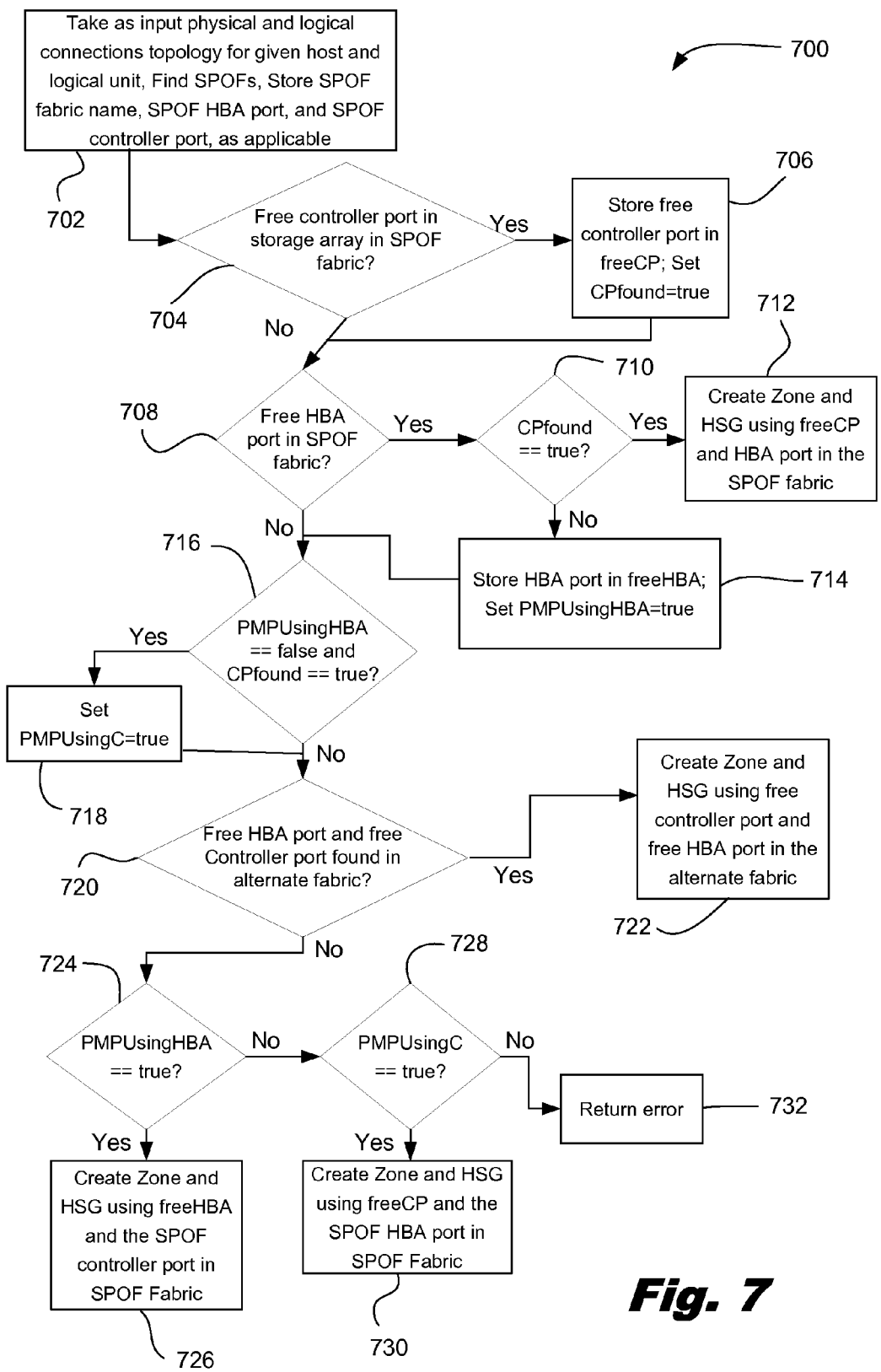
FIG. 7 is a flow chart of a detailed method for creating redundant logical connections, according to one embodiment of principles described herein.

According to one detailed embodiment of the method (700), as shown in FIG. 7, after finding an SPOF, the method obtains the fabric name where the SPOF is found and stores (702) the fabric name in the variable SPOF_Fabric. The SPOF controller port is stored in the variable SPOFControllerPort, and the SPOF HBA port is stored in the variable SPOFHBAport in this same step, as applicable. For example, if the SPOF is found in the logical link between the switch port and the storage array, the controller port where the SPOF logical link terminates is stored in SPOFControllerPort. If the SPOF is found in the logical link between the HBA port on the given host and the switch port, the HBA port is stored in the variable SPOFHBAPort.

A free controller port on the given storage array in the context of the given host and the given storage logical unit, is a controller port that is physically connected to a network fabric using a physical link but not a part of any of the logical connections between the given host and the storage logical unit in that fabric.

A free HBA port on the given host in the context of the given host and the given storage logical unit, is a HBA port that is physically connected to a network fabric using a physical link but not a part of any of the logical connections between the given host and the storage logical unit in that fabric.

If a free controller port is found (704) on the storage array belonging to SPOF_Fabric, then the free controller port may be stored (706) in the variable freeCP and CPfound is set to "true". If no free controller port is found, or after CPfound is set to "true", the method attempts to find (708) a free HBA port in SPOF_Fabric. If a free HBA port is found, and a check (710) on CPfound shows that CPfound is set to "true", the method creates (712) a zone and a HSG using the free controller port (freeCP) and the host port in the fabric of SPOF_Fabric. If a free HBA port is found and ControllerPortFound is "false", then the HBA port is stored (714) in the variable freeHBA for possible partial risk mitigation (or in other words, for a partially redundant logical connection within the SPOF fabric), and the variable PMPUsingHBAPort is set to "true".

If no free HBA port is found, or after storing the HBA port in freeHBA, the method then attempts to determine if and how partial mitigation may be possible, or if there may be an alternate network fabric that may be used. Upon checking (716) PMPUsingHBA, if PMPUsingHBA is "false" and CPfound is "true", PMPUsingC is set (718) to "true". After setting PMPUsingC to "true", or if the conditions in step 716 do not match the check criteria, the method then checks (720) in all applicable alternate fabrics, one at a time, to see if that alternate fabric contains a free HBA port on the given host and a free controller port on the given storage array. If found, a zone and HSG are created (722) using the free HBA and free controller ports from the alternate fabric.

If free HBA port or a free controller port could not be found on any alternate fabrics, but a check (724) shows that PMPUsingHBA is "true", a zone and HSG are created in SPOF_Fabric using freeHBA and the previously stored SPOFControllerPort (726). If PMPUsingHBA is "false", but a check (728) shows that PMPUsingC is "true", a zone and HSG are created in SPOF_Fabric using freeCP and the previously stored SPOFHBAPort (730). If PMPUsingC is "false", then no partial mitigation is possible, and the method returns an error (732).

While the example of FIG. 7 shows a detailed use of the method according to the present specification with specific variables and flow, the method may use any number or name of variables sufficient to meet the goals of the method described.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A non-transitory computer readable storage medium having stored thereon instructions for causing a processor to execute a method for automatically creating redundant logical connections in a network, said method comprising:
   determining where a single point of failure is located between a host and a logical unit hosted on a storage array in a particular network fabric having a given physical and logical connection topology comprising all network fabrics to which both said host and said storage array belong;
   attempting to create a fully redundant logical connection between said host and said logical unit within said particular network fabric;
   if a fully redundant logical connection is not possible within said particular network fabric, attempting to create a fully redundant logical connection between said host and said logical unit using an alternate of said network fabrics; and
   if a fully redundant logical connection is not possible in any alternate network fabric in said topologies, attempting to create a partially redundant logical connection between said host and said logical unit within said particular network fabric.

2. The computer readable storage medium of claim 1, in which said fully redundant logical connection comprises:
   redundant logical links between a host bus adapter port of said host and a switch port;
   redundant logical links between said switch port and any other switch ports physically connected using inter switch links; and
   redundant logical links between said switch port and a controller port on said storage array, said logical unit being mapped on said controller port.

3. The computer readable storage medium of claim 1, in which said fully redundant logical connection comprises:
   redundant logical links between a host bus adapter port of said host and a switch port; and
   redundant logical links between said switch port and a controller port on said storage array, said logical unit being mapped on said controller port,
   in which redundant logical links between said switch port and any other switch ports using inter switch links are automatically taken care of as part of a functionality of said network fabric.

4. The computer readable storage medium of claim 1, in which said method is applied to every host and each of its logical units.

5. The computer readable storage medium of claim 1, in which said method is applied to every host and logical unit having a logical connection that is impacted by a failure.

* * * * *